United States Patent Office 3,598,600
Patented Aug. 10, 1971

3,598,600
PHOTOGRAPHIC COMPOSITIONS AND ELEMENTS
CONTAINING POLYMERIC IMIDAZOLES
Richard C. Tuites and Louis M. Minsk, Rochester, N.Y.,
assignors to Eastman Kodak Company, Rochester, N.Y.
No Drawing. Filed Oct. 9, 1967, Ser. No. 673,933
Int. Cl. G03c 1/34, 1/72
U.S. Cl. 96—109
12 Claims

ABSTRACT OF THE DISCLOSURE

Novel polymers containing imidazole groups attached to the polymer backbone through an amide or an ester linkage are disclosed. Use in a photographic silver halide emulsion and a photographic element of a polymer containing imidazole groups attached thereto is also described.

BACKGROUND OF THE INVENTION

Field of the invention

This invention relates to new polymers. In another aspect it relates to polymers useful as improved antifoggants and fog stabilizers for photographic use. In still another aspect it relates to photographic elements and to photographic silver halide emulsions containing said polymers as antifoggants and fog stabilizers therein.

Description of the prior art

During development of a silver halide emulsion, small amounts of silver halide are reduced to metallic silver regardless of whether or not they have been exposed. This reduction of silver ion produces a background fog which is more specifically referred to as chemical fog.

Chemical fog, apparent in most silver halide systems, has been lessened by prior art methods of processing exposed silver halide material in the presence of compounds which restrict development of unexposed silver halide. Such compounds can be incorporated in the silver halide emulsion. Compounds which have a chemical fog inhibiting effect on emulsions subjected to conditions of high temperature and humidity are referred to as emulsion stabilizers. On the other hand, compounds having chemical fog inhibiting effects on emulsions not exposed to adverse storage conditions are referred to as antifoggants. Although a large number of emulsion stabilizers and antifoggants are disclosed in the prior art, many of these compounds cause undesirable losses in emulsion speed and contrast while others lack adequate compatibility with gelatin emulsions.

SUMMARY OF THE INVENTION

One object of the present invention is to provide novel polymers containing imidazole groups attached to the polymeric backbone through an amide or ester linkage.

Another object of this invention is to provide polymers containing imidazole groups having utility as antifoging and fog-stabilizing agents in photographic use.

Still another object of this invention is to provide novel polymeric compounds which prevent the growth of incubation fog when incorporated into photographic elements and photographic emulsions.

Still another object of this invention is to provide high molecular weight polymers comprising imidazole groups which exhibit fog-stabilizing properties and which are non-migratory, that is they substantially restrict their activity to the substance with which they are contacted.

Other objects will become apparent to those skilled in the art from a reading of the disclosure and the claims as hereafter set forth.

According to one embodiment of this invention, there is provided a new class of polymers which is particularly useful as photographic antifoggants and fog stabilizers. These new polymers are comprised of a polymeric backbone containing imidazole groups attached thereto through an amide or an ester linkage.

According to another embodiment of this invention, there is incorporated into the silver halide emulsion of a photographic element or in a layer contiguous to the silver halide emulsion, a fog-stabilizing amount of a polymer comprising a polymeric backbone containing imidazole groups attached thereto. The polymer stabilizes the emulsion against fog without adversely affecting other sensitometric properties when the dried emulsion has been subjected to an incubation period of prolonged high humidity and temperature.

One preferred group of polymers in accordance with this invention comprises repeating segments having the formula

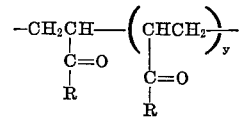

wherein y is 0 or 1, each R is an imidazole group or a photographically inert group, at least 25 percent of each R's substituent in said polymer being selected from groups having the formulae

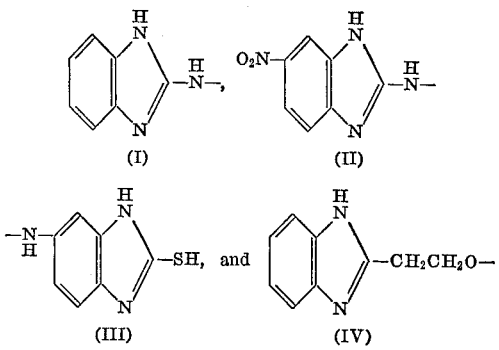

said polymer being characterized by its ability to stabilize a photographic silver halide emulsion against fog.

Another preferred imidazole containing polymer is a hydroxyethyl cellulose derivative. This polymer contains repeating segments having the formula

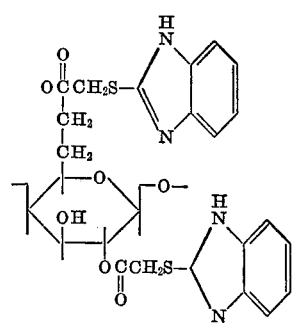

The polymers of this invention can be prepared by reacting an imidazole which is substituted with a functional group, such as an amino or sulfhydryl group, with a polymer containing reactive groups, such as anhydride or ester groups. When the intermediate polymer is one which contains anhydride groups, such as copoly(styrene-maleic anhydride) or poly(acrylic anhydride), at least half of the R groups in the above formula will be hydroxy radicals. Intermediate polymers having inherent viscosities of up to about 1.5 are preferred.

Another group of polymeric imidazoles which can be used as fog stabilizers for photographic emulsions contain repeating segments having the formula

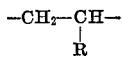

wherein R is the same as defined above or is the radical

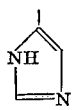

The polymeric imidazoles can be incorporated in a photographic element into a silver halide emulsion or contiguous thereto, for example in a layer in any amount which will stabilize the silver halide emulsion against fog. In general, a concentration of the polymeric imidazole in an amount of from about 0.1 to about 50.0, preferably about 0.12 to about 27.0 grams per mole of silver in the silver halide emulsion can be used with good results.

The preparation of photographic silver halide emulsions such as are suitably stabilized with a polymeric imidazole typically involves three separate operations: (1) emulsification and digestion of silver halide, (2) the freeing of the emulsion of excess water-soluble salts, suitably by washing with water, and (3) the second digestion or "after-ripening" to obtain increased emulsion speed or sensitivity. (Mees, "The Theory of the Photographic Process," 1954). The polymeric imidazole can be added to the emulsion before the final digestion or after-ripening or it can be added immediately prior to the coating.

The silver halide emulsion of a photographic element containing the antifoggants and fog stabilizers of the invention can contain conventional addenda such as gelatin plasticizers, coating aids, and hardeners such as aldehyde hardeners, e.g., formaldehyde, mucochloric acid, glutaraldehyde bis(sodium bisuffite), maleic dialdehyde, aziridines, dioxane derivatives and oxypolysaccharides. Spectral sensitizers which can be used are the cyanines, merocyanines, styryls, and hemicyanines. Sensitizing dyes useful in sensitizing such emulsions are described, for example, in U.S. Pats. 2,526,632 of Brooker and White issued Oct. 24, 1950, and 2,503,776 of Sprague issued Apr. 11, 1950. Developing agents can also be incorporated into the silver halide emulsion if desired or can be contained in a contiguous layer. Various silver salts can be used as the sensitive salt such as silver bromide, silver iodide, silver chloride, or silver halides such as silver chlorobromide or silver bromoiodide. The silver halides used can be those which form latent images predominantly on the surface of the silver halide grains or those which form latent images inside the silver halide crystals such as described in U.S. Pat. 2,592,250 of Davey and Knott issued Apr. 8, 1952.

The silver halide emulsion layer of a photographic element containing the antifoggants and fog stabilizers of the invention can contain any of the hydrophilic, water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the photographic element can also contain dispersed polymerized vinyl compounds. Such compounds are disclosed, for example, in U.S. Pats. 3,142,568 of Nottorf issued July 28, 1964; 3,193,386 of White issued July 6, 1965; 3,062,674 of Houck, Smith and Yudelson issued Nov. 6, 1962; and 3,220,844 of Houck, Smith and Yudelson issued Nov. 30, 1965; and include the water-insoluble polymers of alkyl acrylates and methacrylates, acrylic acid, sulfoalkyl acrylates or methacrylates and the like.

The silver halide emulsion of a photographic element containing the antifoggants and fog stabilizers of the invention can be coated on a wide variety of supports. Typical supports are cellulose nitrate film, cellulose ester film, polyvinyl acetal film, polystyrene film, poly(ethylene terephthalate) film and related films or resinous materials as well as glass, paper, metal and the like. Supports such as paper which are coated with α-olefin polymers, particularly polymers of α-olefins containing two or more carbons atoms, as exemplified by polyethylene, polypropylene, ethylene-butene copolymers and the like can also be employed.

The speed of the photographic emulsions containing the antifoggants and fog stabilizers of the invention can be further enhanced by including in the emulsions a variety of hydrophilic colloids such as carboxymethyl protein of the type described in U.S. Pat. 3,011,890 of Gates, Jr., Miller and Koller issued Dec. 5, 1961, and polysaccharides of the type described in Canadian Pat. 635,206 of Koller and Russell issued Jan. 23, 1962.

Photographic emulsions containing the antifoggants and fog stabilizers of the invention can also contain speed-increasing compounds such as quaternary ammonium compounds, polyethylene glycols or thioethers. Frequently, useful effects can be obtained by adding the aforementioned speed-increasing compounds to the photographic developer solutions instead of, or in addition to, the photographic emulsions.

Photographic elements containing the antifoggants and fog stabilizers of the instant invention can be used in various kinds of photographic systems. In addition to being useful in X-ray and other non-optically sensitized systems, they can also be used in orthochromatic, panchromatic and infrared sensitive systems. The sensitizing addenda can be added to photographic systems before or after any sensitizing dyes which are used.

Silver halide emulsions containing the antifoggants and fog stabilizers of the invention can be used in color photography, for example, emulsions containing color-forming couplers or emulsions to be developed by solutions containing couplers or other color-generating materials, emulsions of the mixed-packet type such as described in U.S. Pat. 2,698,794 of Godowsky issued Jan. 4, 1955; in silver dye-bleach systems; and emulsions of the mixed-grain type such as described in U.S. Pat. 2,592,243 of Carroll and Hanson issued Apr. 8, 1952.

Silver halde emulsions containing the antifoggants and fog stabilizers of the invention can be sensitized using any of the well-known techniques in emulsion making, for example, by digesting with naturally active gelatin or various sulfur, selenium, tellurium compounds and/or gold compounds. The emulsions can also be sensitized with salts of noble metals of Group VIII of the Periodic Table which have an atomic weight greater than 100.

Silver halide emulsions containing the antifoggants and fog stabilizers of the invention can be used in diffusion transfer processes which utilize the underveloped silver halide in non-image areas of the negative to form a positive by dissolving the undeveloped silver halide and precipitating it on a silver layer in close proximity to the original silver halide emulsion layer. Such processes are described in U.S. Pats. 2,352,014 of Rott issued June 20, 1944; 2,543,181 of Land issued Feb. 27, 1951; and 3,020,155 of Yackel, Yutzy, Foster and Rasch issued Feb. 6, 1962. The emulsions can also be used in diffusion transfer color processes which utilize a diffusion transfer of an imagewise distribution of developer, coupler or dye, from a light-sensitive layer to a second layer, while the two layers are in close proximity to one another. Silver halide emulsions containing the antifoggants and fog stabilizers of the invention can be processed in stabilization processes such as the ones described in U.S. Pat. 2,614,927 of Broughton and Woodward issued Oct. 21, 1952, and as described in the article "Stablization Processing of Films and Papers" by H. D. Russell, E. C. Yackel and J. S. Bruce in P.S.A. Journal, Photographic Science and Technique, volume 16B, October 1950.

The antifogging and fog stabilizing agents of this invention can be advantageously incorporated during manufacture in silver halide emulsions representing the variations described above. Moreover, fog control and fog stability can be achieved in binderless silver halide films prepared by vapor deposition of silver halide on a suitable support by coating the antifogging and fog stabilizing agents of the invention over the vapor deposited layer of silver halide.

Combinations of all the above-mentioned addenda can be used if desired.

The following examples illustrate the best modes contemplated for carrying out this invention; although it will be understood that these examples are included merely for purposes of illustration and are not intended to limit the scope of the invention.

EXAMPLE 1

To a solution of poly(acrylic anhydride) having an inherent viscosity in dimethylformamide of 0.31 (12.6 g., 0.1 mole) in 200 ml. of dimethylformamide is added 2-aminobenzimidazole (13.3 g., 0.1 mole). The reaction mixture is stirred under nitrogen for 4 hr. at 75° C. The product is precipitated by pouring the reaction mixture into 2-3 liters of water with stirring. The precipitate is filtered off, washed again with water and dried in a vacuum oven at 40° C., overnight. After drying, the product is ground to a fine powder, washed with 600 ml. of methanol to insure removal of any unreacted amine, filtered, and dried again in a vacuum oven overnight. The yield of off-white polymer is 20 g.

*Analysis.*—Found (percent): C, 57.6; H, 5.4; N, 14.8, 15.3. The analytical results for nitrogen are consistent with a product containing about 90 percent of the theoretical amount of the benzimidazole system off the polymer chain. The product contains recurring segments having the formulae wherein the ratio of the values of m to n is about 5:4.

The product is suspended in water and dissolved by adding 10 percent sodium hydroxide. The solution, pH; 8.8, is subjected to photographic testing as hereinafter described.

EXAMPLE 2

The process of Example 1 is repeated substituting for the poly(acrylic anhydride) an equimolar amount of copoly(ethylene-maleic anhydride) having an inherent viscosity in dimethylformamide of 0.82. The product contains recurring segments having the formula

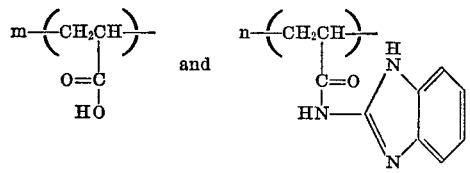

Analysis of the product for nitrogen indicates that the product contains about 95 percent of the theoretical amount of imidazole groups off the polymer chain.

EXAMPLE 3

The process of Example 1 is repeated substituting for the 2-aminobenzimidazole an equimolar amount of 2-amino-6-nitrobenzimidazole. The product contains recurring segments having the formulae wherein the ratio of the values of m and n is about 3:1. Analysis of the product for nitrogen indicates that the product contains about 40 percent of the theoretical amount of imidazole groups off the polymer chain.

EXAMPLE 4

The process of Example 1 is repeated substituting for the 2-aminobenzimidazole an equimolar amount of 2-mercapto-6-aminobenzimidazole and using a poly(acrylic anhydride) having an inherent viscosity in dimethylformamide of 0.23. The product contains recurring segments having the formulae wherein the ratio of the values of m and n is about 3:2. Analysis of the product for nitrogen indicates that the product contains about 80 percent of the theoretical amount of imidazole groups off the polymer chain.

EXAMPLE 5

The process of Example 1 is repeated substituting for the 2-aminobenzimidazole an equimolar amount of 2-($\beta$-hydroxyethyl)benzimidazole and using a poly(acrylic anhydride) having an inherent viscosity in dimethylformamide of 0.13. The product contains recurring segments having the formula wherein the ratio of the values of m and n is about 3:2. Analysis of the product for nitrogen indicates that the product contains about 77 percent of the theoretical amount of imidazole groups off the polymer chain.

EXAMPLE 6

To a solution of 14.6 g. (0.1 mole) of poly(phenyl acrylate) having an inherent viscosity in acetone of 0.3 in 250 ml. of N-methylpyrrolidone is added 2-aminobenzimidazole (25 g., 0.188 mole). The mixture is stirred under nitrogen at 160–170° C. for 20 hr. The reaction mixture is homogeneous throughout and turns deep red during the course of the heating period. The mixture is allowed to cool somewhat and the product is then precipitated into 2–3 liters of diethyl ether. The ether is decanted and the residue washed with another portion of ether and dried in a vacuum oven at 40–50° C. overnight. After drying, the product is ground to a fine powder, washed with 1–2 liters of methanol to insure removal of any residual amine, and redried. Yield of light yellow-green solid is 13.5 g.

*Analysis.*—Calcd. for $C_9H_9N_3O$ (percent): C, 64.2; H, 4.8; N, 22.5. Found (percent): C, 63.6; H, 5.0; N, 20.1. The analytical results for nitrogen are consistent with a product containing about 89 percent of the theoretical amount of the imidazole system off the polymer chain. The product contains repeating segments having the formula

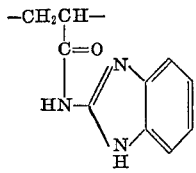

The product is dissolved in dimethylformamide and the solution is subjected to photographic testing as hereinafter described.

EXAMPLE 7

Anhydrous urocanic acid (5–6 g.) is placed in a distilling apparatus and heated under vacuum (about 0.02 mm.) in a silicon oil bath. At about 205–210° C., the solid begins to melt and decompose with gas evolution (as evidenced by a reduction in vacuum). An attempt to distill out the product vinylimidazole under these conditions is unsuccessful, as the material in the still-pot polymerized. On cooling, about 3 g. of a light brown solid is recovered.

*Analysis.*—Calcd. (percent): N, 29.8. Found (percent): N, 26.2. The infrared spectrum of the product shows the loss of the carbonyl absorption due to the carboxylic acid group of the starting material. The product contains repeating segments having the formula

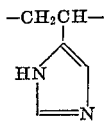

The product is dissolved in a mixture of 2 parts of water and 1 part of methanol and is subjected to photographic testing as hereinafter described.

EXAMPLE 8

Chloroacetylated hydroxyethylcellulose, with a chlorine content of about 20 percent, corresponding roughly to two chloroester groups per repeating unit of polymer (8.8 g., about 0.025 mole) along with 2-mercaptobenzimidazole (6.7 g., 0.05 mole) and sodium carbonate (2.7 g., 0.025 mole) are heated in 200 ml. distilled dimethylformamide with stirring at 70–80° C. under nitrogen for 24 hours. The heterogeneous reaction mixture becomes very dark during the course of the heating period. The product is precipitated by pouring the reaction mixture into 3 liters of distilled water. After filtering, the product is washed with methanol to allow for removal of any unreacted mercaptobenzimidazole. After a final water wash, the product is filtered and dried overnight in a vacuum oven. The yield of brown solids is 8.5 g.

*Analysis.*—Found (percent): C, 52.2; H, 5.4; N, 8.0; S, 4.8; Cl, <1. The nitrogen analysis is consistent with a product containing about 80 percent of the theoretical amount of benzimidazole groupings off the polymer chain.

The sulfur analysis indicates that only about 50 percent of the theoretical amount of the heterocyclic groups has been incorporated into the molecule. The product, hydroxyethylcellulose - bis(mercaptobenzimidazol - 2 - yl acetate), contains repeating segments having the formula

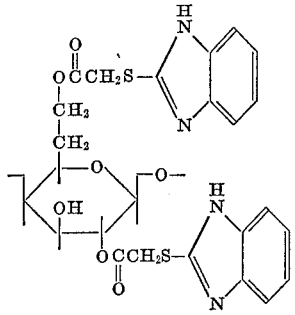

The product is dissolved in dimethylformamide and tested as an antifoggant as described hereinafter.

EXAMPLE 9

Low molecular weight poly(phenyl acrylate) having a molecular weight of approximately 760 and terminated with 2-mercaptoethanol (14.6 g., 0.1 mole) is dissolved in 250 ml. of distilled N-methylpyrrolidone. 2-aminobenzimidazole (25 g., 0.188 mole) is added and the reaction mixture is heated with stirring under nitrogen at 160–170° C. for 24 hours. The reaction medium is homogeneous and turns deep reddish-brown during the course of the heating period. After cooling, the product is precipitated into 3 liters of diethyl ether. The precipittae is then washed three times with fresh quantities of ether to allow for removal of any unreacted amine, filtered and dried. The dried, powdered polymer is washed once with one liter of methanol and redried. The yield of yellow solid is about 6 g.

*Analysis.*—Found (percent): C, 60.1; H, 5.5; N, 20.5; S, <1.

The nitrogen analysis is consistent with a product wherein about 90 percent of the theoretical amount of the imidazole groups have been incorporated onto the polymer.

The product is dissolved in dimethylformamide and tested as an antifoggant as described hereinafter.

The product consists essentially of repeating segments having the formula

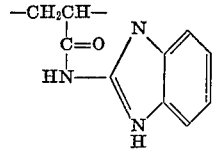

and is terminated at one end thereof by —H and on the other end thereof by the group —$SCH_2CH_2OH$.

Each of the compounds prepared in Examples 1 to 9 are added to separate portions of a high speed silver bromoiodide emulsion. For purposes of comparison, high speed silver bromoiodide emulsions are also prepared incorporating the hydrolysis products of intermediate polymers of the types used in the foregoing examples i.e., polyacrylic acid obtained by hydrolysis of polyacrylic anhydride having an inherent viscosity in dimethylformamide of 0.79 and copoly(ethylene-maleic acid) obtained by hydrolysis of copoly(ethylene-maleic anhydride) having an inherent viscosity in dimethylformamide of 0.13. Each emulsion sample is coated on a cellulose acetate film support at a coverage of 459 mg. of silver and 1040 mg. of gelatin per square foot. A sample of each film coating is exposed on an intensity scale sensitometer, processed for five minutes in Kodak Developer DK-50, fixed, washed and dried. The photographic results obtained from these tests are listed in the table below.

TABLE

| Compound of example | G./mole Ag | Fresh | | | Incubation at 120° F. and 50% relative humidity for 2 weeks | | |
|---|---|---|---|---|---|---|---|
| | | Rel. speed | Gamma | Fog | Rel. speed | Gamma | Fog |
| Control | | 100 | 1.28 | 0.14 | 53 | 0.80 | 0.75 |
| 1 | 27.0 | 97 | 1.35 | 0.10 | 95 | 1.20 | 0.35 |
| 2 | 9.0 | 107 | 1.28 | 0.10 | 58 | 1.03 | 0.69 |
| Control | | 100 | 1.60 | 0.16 | 18 | 0.62 | 0.95 |
| 3 | 0.18 | 87 | 1.53 | 0.16 | 17.5 | 0.70 | 0.84 |
| 4 | 0.75 | 102 | 1.42 | 0.10 | 53 | 0.85 | 0.32 |
| Control | | 100 | 1.26 | 0.14 | 33 | 0.75 | 0.81 |
| 5 | 9.0 | 16.5 | 0.67 | 0.05 | 5.7 | 0.53 | 0.15 |
| 6 | 27.0 | 18 | | 0.10 | 12.3 | | 0.17 |
| Control | | 100 | 1.26 | 0.14 | 63 | 1.03 | [1] 0.45 |
| 7 | 0.9 | 47 | 1.10 | 0.10 | 33 | 0.88 | 0.24 |
| Control | | 100 | 1.38 | 0.15 | 39 | 0.79 | 0.78 |
| 8 | 0.6 | 80 | 1.25 | 0.11 | 58 | 1.02 | 0.38 |
| Control | | 100 | 1.27 | 0.13 | 71 | 1.06 | 0.23 |
| 9 | 0.12 | 67 | 1.20 | 0.07 | 63 | 1.05 | 0.08 |
| Control | | 100 | 1.67 | 0.16 | 48 | 0.95 | [1] 0.47 |
| Polyacrylic acid | 18.0 | 110 | 1.65 | 0.20 | 35.5 | 0.85 | [1] 0.83 |
| Copoly(ethylene maleic acid) | 45.0 | 123 | 1.62 | 0.24 | | | [1] >1.0 |

[1] 1-week incubation instead of 2-week incubation.

The results in the above table show that the compounds of this invention prevent the growth of incubation fog when incorporated in photographic emulsions but that polymers which do not contain the imidazole nucleus either are inert or cause fog in photographic emulsions. Moreover, wandering of the antifoggant and fog stabilizers of this invention is minimized or eliminated. That is, their activity is restricted to the substance with which they are contacted, such as for example, a particular photographic emulsion layer.

Although the invention has been described in considerable detail with reference to certain embodiments thereof, it will be understood that variations and modifications can be effected without departing from the spirit and scope of the invention as described hereinabove and as defined in the appended claims.

We claim:

1. A fog-stabilized photographic silver halide emulsion containing a fog-stabilizing amount of a polymer comprising a polymeric backbone containing recurring imidazole groups attached thereto through an amide linkage at the nitrogen or an ester linkage.

2. The emulsion of claim 1 wherein said polymer is present in an amount of from about 0.12 to about 27.0 grams per mole of silver in said silver halide emulsion.

3. A fog-stabilized photographic silver halide emulsion containing a fog-stabilizing amount of a polymer comprising repeating segments having the formula

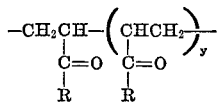

wherein y is 0 or 1, each R is an imidazole group or a photographically inert group, at least 25 percent of each R's substituent in said polymer being selected from groups having the formulae

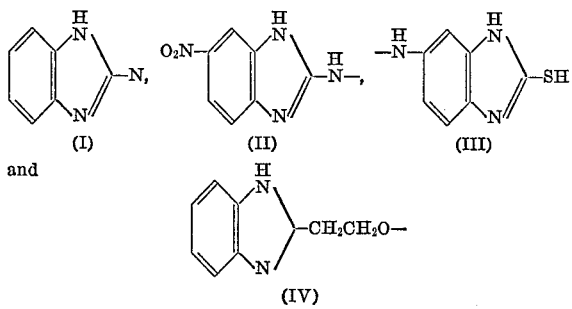

and

4. A fog-stabilized photographic silver halide emulsion containing a fog-stabilizing amount of a polymer containing repeating segments having the formula

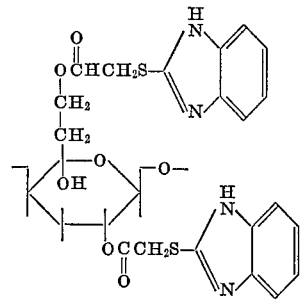

5. A fog-stabilized photographic silver halide emulsion containing a fog-stabilizing amount of a polymer comprising a polymeric backbone containing recurring imidazole groups attached thereto wherein said polymer comprises repeating segments having the formula

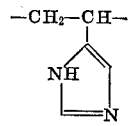

6. A photographic element comprising a support coated with a silver halide layer, said element containing a fog-stabilizing amount of a polymer comprising a polymeric backbone containing recurring imidazole groups attached thereto through an amide linkage at the nitrogen or an ester linkage, said polymer contained either in said silver halide layer or in a layer contiguous thereto.

7. A photographic element of claim 6 wherein said layer is a silver halide emulsion.

8. A photographic element comprising a support coated with a silver halide emulsion, said emulsion containing a fog stabilizing amount of a polymer comprising repeating segments having the formula

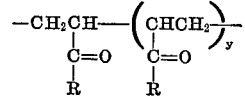

wherein y is 0 or 1, each R is an imidazole group or a photographically inert group, at least 25 percent or each R's substituent in said polymer being selected from groups having the formulae (I) 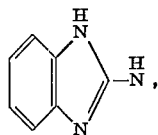  (II) 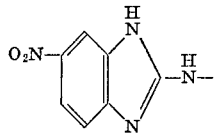

(III) 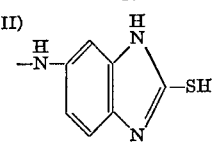  (IV) 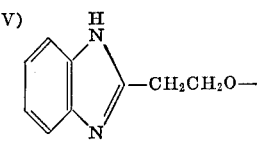

9. A photographic element comprising a support coated with a silver halide emulsion, said emulsion containing a fog-stabilizing amount of a polymer containing repeating segments having the formula

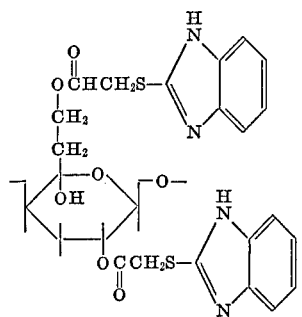

10. A photographic element comprising a support coated with a silver halide layer, said element containing a fog-stabilizing amount of a polymer comprising a polymeric backbone containing recurring imidazole groups attached thereto wherein said polymer contains repeating segments having the formula

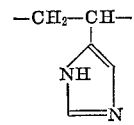

and wherein said polymer is contained either in said silver halide layer or in a layer contiguous thereto.

11. The photographic element of claim 7 wherein said polymer is present in said silver halide emulsion.

12. The photographic element of claim 7 wherein said polymer is contiguous to said silver halide emulsion.

References Cited

UNITED STATES PATENTS

| | | | |
|---|---|---|---|
| 2,646,421 | 7/1953 | Allen et al. | 96—100 |
| 3,023,103 | 2/1962 | Persch et al. | 96—104 |
| 3,137,578 | 6/1964 | De Selmo | 96—109 |
| 3,271,154 | 9/1966 | Dersch et al. | 96—109 |

NORMAN G. TORCHIN, Primary Examiner

R. E. FICHTER, Assistant Examiner

U.S. Cl. X.R.

96—114